UNITED STATES PATENT OFFICE.

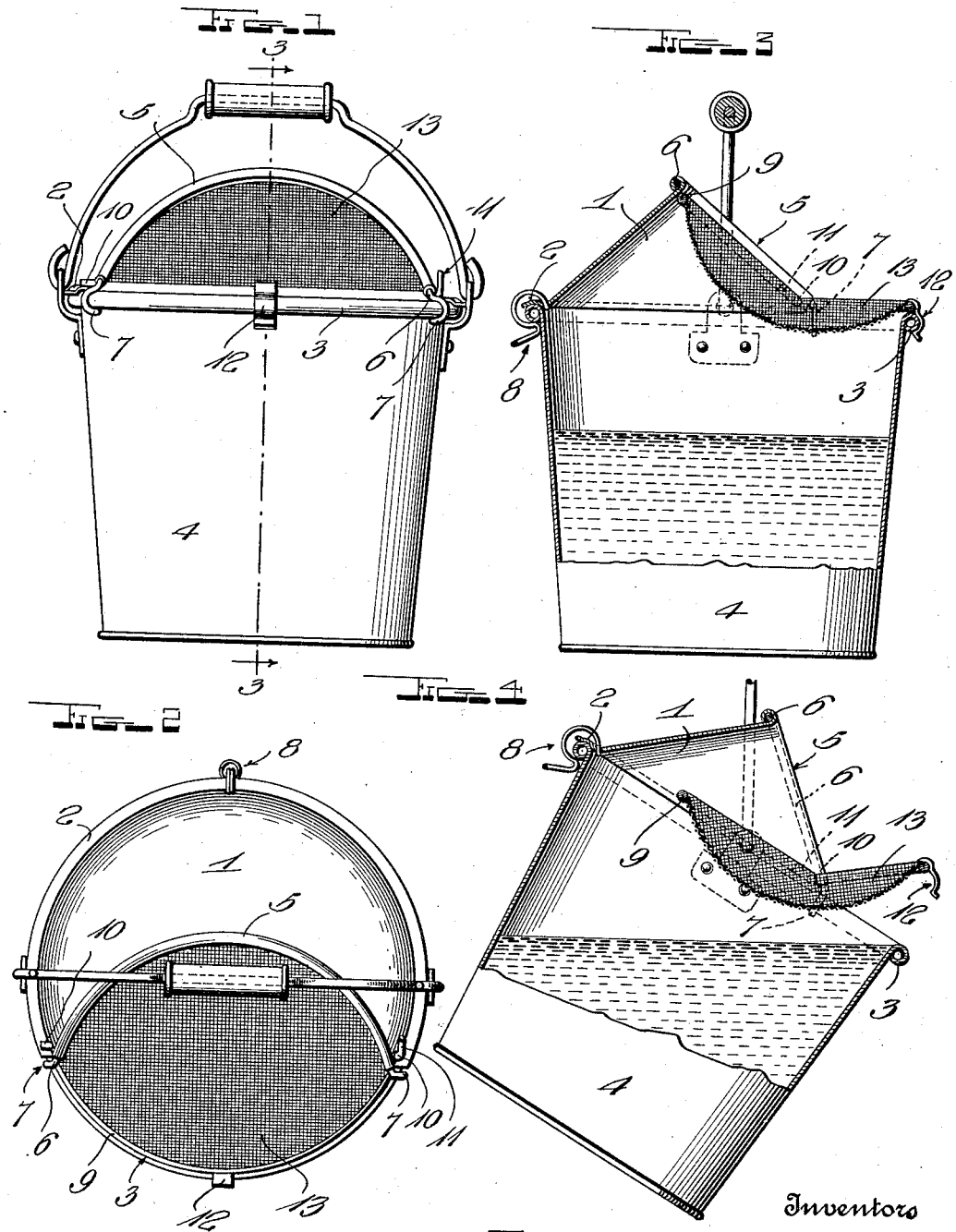

TIMOTHY W. BARTON AND WILLIAM W. WALDO, OF WEISER, IDAHO.

MILK-BUCKET.

1,318,526.      Specification of Letters Patent.      Patented Oct. 14, 1919.

Application filed March 21, 1919. Serial No. 284,051.

*To all whom it may concern:*

Be it known that we, TIMOTHY W. BARTON and WILLIAM W. WALDO, citizens of the United States, residing at Weiser, in the county of Washington and State of Idaho, have invented certain new and useful Improvements in Milk-Buckets; and we do declare the following to be a full, clear, and exact description of the invention, such as will enable others skilled in the art to which it appertains to make and use the same.

Our invention has for its primary object to provide a simply constructed and inexpensive, yet a highly efficient and desirable top for milk buckets so constructed as to strain the milk before it enters the pail, thus preventing any foreign matter from entering and also preventing splashing of the milk, as often occurs when milking directly into the pail.

Further objects are to provide a novel mounting for the screen or strainer to permit upward swinging thereof when emptying the bucket; to provide simple and efficient means for limiting the tilting of said screen or strainer; and to provide for detachably mounting the entire device on an ordinary milk bucket.

With the foregoing in view, the invention resides in the novel features of construction and unique association of parts hereinafter fully described and claimed, reference being made to the accompanying drawing which forms a part of this application.

Figure 1 is a front elevation of a milk bucket equipped with our invention;

Fig. 2 is a top plan view;

Fig. 3 is a central vertical section on the plane of the line 3—3 of Fig. 1; and Fig. 4 is a view similar to Fig. 3 illustrating the relation of parts when emptying the pail.

In the drawings above briefly described, the numeral 1 designates a sheet metal cowl whose base edge is provided with a bead or flange 2 adapted to rest upon the rim 3 of an ordinary milk bucket 4, said base edge occupying considerably more than one-half of the circumference of the bucket rim. The front edge of the cowl 1 is located in a plane inclining upwardly and rearwardly and is provided with a bead 5 having therein a wire 6, the ends of this wire extending beyond the bead ends and being bent to form hooks 7 for engagement with the bead of the bucket 4. The rear portion of the cowl is provided with a preferably pivoted fastener 8 which also engages the bucket bead and coöperates with the hooks 7 in securing the cowl in place.

A screen frame 9, preferably formed of wire as shown, is shaped to contact with the portion of the rim 3 which is unoccupied by the cowl 1, and for contact with the lower side of said cowl, at the front edge of the latter, and said frame is provided with outwardly extending trunnions 10 passing through openings in the sides of the cowl, whereby said frame is pivotally mounted. One of the trunnions 10 is provided with a lateral finger 11 adapted to strike the flange 2 and thus limit the amount which the front edge of the screen frame may be raised. A spring catch 12 on the frame normally holds the latter in contact with the bucket rim and the cowl.

A suitable screen or strainer 13, preferably but not necessarily formed of wire fabric, is secured to the frame 9 and when this frame is in the position of Fig. 2, the milk will be strained before it enters the bucket, thus excluding all foreign matter. When, however, the catch 12 is released and the front end of the screen frame swung upwardly as seen in Fig. 3, the milk may be emptied without danger of allowing any deposits on the screen to enter the same.

The device is simple and inexpensive, may be easily attached to milk pails now in use, and will be found highly efficient and in every way desirable. Since probably the best results are obtained from the details disclosed, they may well be followed, but within the scope of the invention as claimed, numerous minor changes may well be made.

What we claim is:

1. A milk bucket cover comprising a cowl, a screen extending from the edge of said cowl to the rim of the bucket, means hingedly mounting said screen to permit upward swinging of its edge when emptying the bucket, and means for normally holding said screen in operative relation with said cowl to form therewith a complete closure for the bucket top.

2. A milk bucket cover comprising a cowl whose base edge engages the rim of the bucket throughout a portion of its circumference and whose front edge is located in a plane inclining upwardly and rearwardly, a screen frame shaped for contact with the portion of the bucket rim unoccupied by said cowl and with the bottom of said cowl at the front edge thereof, trunnions extending from said frame through the sides of the cowl to pivotally mount said frame and allow its front edge to be raised, a screen secured to said frame, and a catch for normally holding said frame against pivotal movement.

3. A structure as specified in claim 2, the base edge of said cowl having a bead, and one of said trunnions having a laterally extending finger to abut said flange and limit the upward swinging of the screen frame.

4. A structure as specified in claim 2, the front edge of said cowl having a bead and a wire in said bead, the ends of the wire being bent to form hooks to engage the bead at the rim of the bucket.

5. A milk bucket cover comprising a cowl whose base edge engages the rim of the bucket throughout more than one-half of its circumference, and whose front edge is disposed in a plane inclining upwardly and rearwardly, the front corners of the cowl, at the juncture of said base and front edges, having openings and being additionally provided with hooks to engage the rim bead of a bucket, an additional fastener on the rear portion of said cowl to likewise engage the rim bead, a screen frame shaped to fill the opening between the front edge of the cowl and the portion of the bucket rim unoccupied by said cowl, a portion of said frame being adapted for contact with said rim and the remaining portion of said frame contacting with the lower side of said cowl, trunnions on said frame received in the aforesaid openings in said cowl, a fastener on the front portion of said frame adapted to engage the rim bead to hold said frame against pivotal movement, and a screen secured to said frame.

In testimony whereof we have hereunto set our hands.

TIMOTHY W. BARTON.
WILLIAM W. WALDO.

Copies of this patent may be obtained for five cents each, by addressing the "Commissioner of Patents, Washington, D. C."